(12) United States Patent
Vaya (10) Patent No.: US 9,122,453 B2
(45) Date of Patent: Sep. 1, 2015

(54) METHODS AND SYSTEMS FOR PROCESSING CROWDSOURCED TASKS (71) Applicant: Xerox Corporation, Norwalk, CT (US)

(72) Inventor: Shailesh Vaya, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 183 days.

(21) Appl. No.: 13/942,989

(22) Filed: Jul. 16, 2013

(65) Prior Publication Data
US 2015/0026579 A1 Jan. 22, 2015

(51) Int. Cl.
G06F 3/16 (2006.01)
G06Q 10/06 (2012.01)
G10L 15/26 (2006.01)

(52) U.S. Cl.
CPC ........ G06F 3/167 (2013.01); G06Q 10/063112 (2013.01); G10L 15/26 (2013.01)

(58) Field of Classification Search
CPC .......... G06F 3/16; G06F 3/048; G10L 15/265
USPC ........................................................ 715/728
See application file for complete search history.

(56) References Cited

U.S. PATENT DOCUMENTS

2008/0082332 A1* 4/2008 Mallett et al. ................. 704/250
2008/0140401 A1* 6/2008 Abrash et al. ................. 704/251
2008/0162141 A1* 7/2008 Lortz .......................... 704/270.1
2011/0067059 A1* 3/2011 Johnston et al. ................ 725/39
2012/0323576 A1* 12/2012 Wang et al. ................... 704/251
2014/0372160 A1* 12/2014 Nath et al. .................... 705/7.13

OTHER PUBLICATIONS

Digitizing paper forms with mobile imaging technologies, Nicola Dell, Nathan Breit, Timóteo Chaluco, Jessica Crawford and Gaetano Borriello, http://dl.acm.org/citation.cfm?id=2160601.2160604, ACM Dev 2012.
Shreddr: pipelined paper digitization for low-resource organizations, by Kuang Chen, Akshay Kannan, Yoriyasu Yano, Joseph M. Hellerstein and Tapan S Parikh ACM Dev'2012.

* cited by examiner

Primary Examiner — Angie Badawi (57) ABSTRACT

The disclosed embodiments illustrate methods and systems for processing one or more crowdsourced tasks. The method comprises converting an audio input received from a crowdworker to one or more phrases by one or more processors in at least one computing device. The audio input is at least a response to a crowdsourced task. A mode of the audio input is selected based on one or more parameters associated with the crowdworker. Thereafter, the one or more phrases are presented on a display of the at least one computing device by the one or more processors. Finally, one of the one or more phrases is selected by the crowdworker as a correct response to the crowdsourced task.

20 Claims, 6 Drawing Sheets

METHODS AND SYSTEMS FOR PROCESSING CROWDSOURCED TASKS

TECHNICAL FIELD

The presently disclosed embodiments are related, in general, to crowdsourcing. More particularly, the presently disclosed embodiments are related to methods and systems for processing crowdsourced tasks.

BACKGROUND

With emergence and growth of crowdsourcing technology, a large number of remote workers are being lured towards crowdsourcing platforms, as the crowdsourcing platforms offer a part-time employment opportunity and provide a secondary source of income. Further, in many developing countries, an increasing number of remote workers may earn a significant portion of their monthly income by attempting crowdsourced tasks. Most of the crowdsourcing tasks may require data entry from the remote workers. However, the remote workers may not be adequately skilled at typing which may hamper their productivity and lower their motivation level. Hence, there is a need to explore other means for data entry.

SUMMARY

According to embodiments illustrated herein there is provided a method for processing one or more crowdsourced tasks in at least one computing device. The method comprises converting an audio input received from a crowdworker to one or more phrases by one or more processors in the at least one computing device. The audio input is at least a response to a crowdsourced task. Further, a mode of the audio input is selected based on one or more parameters associated with the crowdworker. Thereafter, the one or more phrases are presented on a display of the at least one computing device by the one or more processors. Finally, one of the one or more phrases is selected by the crowdworker as a correct response to the crowdsourced task.

According to embodiments illustrated herein there is provided a system comprising at least one computing device for processing one or more crowdsourced tasks. The at least one computing device comprises one or more processors operable to convert an audio input received from a crowdworker to one or more phrases. The audio input is at least a response to a crowdsourced task. Further, a mode of the audio input is selected based on one or more parameters associated with the crowdworker. The one or more processors are further operable to present the one or more phrases on a display of the at least one computing device. One of the one or more phrases is selected by the crowdworker as a correct response to the crowdsourced task.

According to embodiments illustrated herein there is provided a computer program product for use with a computing device. The computer program product includes a non-transitory computer-readable medium having a computer readable program code embodied therein for processing one or more crowdsourced tasks. The computer readable program code is executable by one or more processors in at least one computing device for presenting a crowdsourced task on a display of the at least one computing device through a user interface. The crowdsourced task is presented in response to receiving a first audio input from a crowdworker. The first audio input corresponds to at least a command to control the user interface. Thereafter, a second audio input received from the crowdworker is converted to one or more phrases. The second audio input is at least a response to the crowdsourced task. Moreover, a mode of the second audio input is selected based on one or more parameters associated with the crowdworker. The mode of the second audio input comprises at least one of a character-wise speech, or a word-wise speech. Finally, the one or more phrases are presented on the display. One of the one or more phrases is selected by the crowdworker as a correct response to the crowdsourced task.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

DEFINITIONS

The following terms shall have, for the purposes of this application, the respective meanings set forth below.

A "task" refers to a piece of work, an activity, an action, a job, an instruction, or an assignment to be performed. Tasks may necessitate the involvement of one or more workers. Examples of tasks include, but are not limited to, digitization of a document, generating a report, evaluating a document, conducting a survey, writing a code, extracting data, translating text, and the like.

"Crowdsourcing" refers to distributing tasks by soliciting the participation of loosely defined groups of individual crowdworkers. A group of crowdworkers may include, for example, individuals responding to a solicitation posted on a certain website such as, but not limited to, Amazon Mechanical Turk and Crowd Flower.

A "crowdsourcing platform" refers to a business application, wherein a broad, loosely defined external group of people, communities, or organizations provides solutions as outputs for any specific business processes received by the application as input. In an embodiment, the business application may be hosted online on a web portal (e.g., crowdsourcing platform servers). Various examples of the crowdsourcing platforms include, but are not limited to, Amazon Mechanical Turk or Crowd Flower.

A "crowdworker" refers to a workforce/worker(s) that may perform one or more tasks, which generate data that contributes to a defined result. According to the present disclosure, the crowdworker(s) includes, but is not limited to, a satellite center employee, a rural business process outsourcing (BPO) firm employee, a home-based employee, or an internet-based employee. Hereinafter, the terms "crowdworker", "worker", "remote worker" "crowdsourced workforce", and "crowd" may be interchangeably used.

An "audio input" refers to a voice input received from a user. In an embodiment, the audio input may be a response for a crowdsourced task, or a voice-based command to control a user interface.

A "phrase" refers to a sentence or a part thereof in a particular language. In an embodiment, the phrase may be a single word, or a group of words corresponding to one or more parts of speech including verbs, nouns, pronouns, adverbs, adjectives, prepositions, conjunctions, interjections, and/or determinants.

A "mode of audio input" refers to a type of audio input received from a crowdworker in response to a presented crowdsourced task. In an embodiment, the modes of audio input include a character-wise speech, or a word-wise speech.

A "character-wise speech" refers to a character-by-character audio input provided by a crowdworker. For example, if the crowdworker has to say a word "Hello", he/she would spell out the word character-wise like "H", "e", "l", "l", "o".

A "word-wise speech" refers to a word-by-word audio input provided by a crowdworker. For example, if the crowdworker has to say a phrase "Hello World", he/she would pronounce the word "Hello" followed by a pause and then pronounce the word "World".

A "performance score" refers to a score of a crowdworker on a set of tasks. In an embodiment, the performance score is determined as a ratio of number of correctly attempted tasks to total number of attempted tasks.

Figure 1:
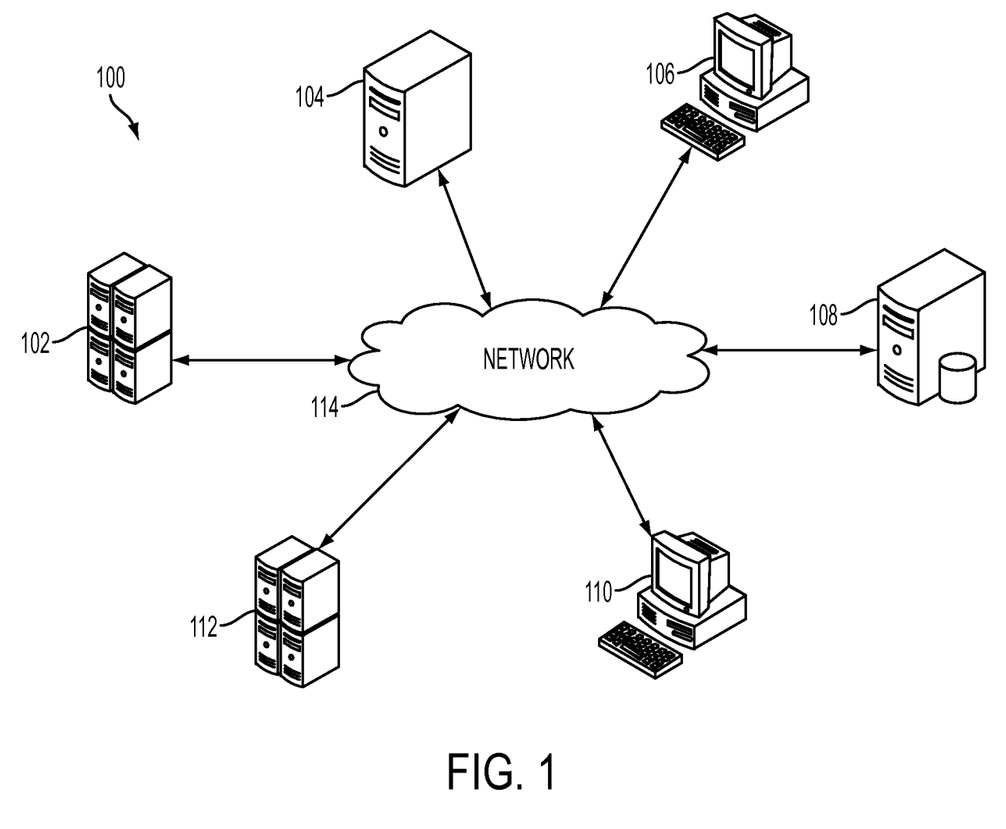
FIG. 1 is a block diagram of a system environment in which various embodiment can be implemented.

FIG. 1 is a block diagram of a system environment 100 in which various embodiments can be implemented. The system environment 100 includes a crowdsourcing platform server 102, an application server 104, a requestor computing device 106, a database server 108, a crowdworker computing device 110, a speech recognition server 112, and a network 114.

The crowdsourcing platform server 102 is operable to host one or more crowdsourcing platforms. One or more crowdworkers are registered with the one or more crowdsourcing platforms. Further, the crowdsourcing platform offers one or more tasks to the one or more crowdworkers. In an embodiment, the crowdsourcing platform presents a user interface to the one or more crowdworkers through a web-based interface or a client application. The one or more crowdworkers may access the one or more tasks through the web-based interface or the client application. Further, the one or more crowdworkers may submit a response to the crowdsourcing platform through the user interface. In an embodiment, the crowdsourcing platform server 102 may be realized through an application server such as, but not limited to, Java application server, .NET framework, and Base4 application server.

In an embodiment, the application server 104 is operable to generate the one or more tasks based on one or more task requests received from the requestor computing device 106. Further, the application server 104 uploads the one or more generated tasks on the crowdsourcing platform. In an embodiment, the application server 104 receives responses for the one or more uploaded tasks from the one or more crowdworkers through the crowdsourcing platform. The application server 104 may validate the responses and accordingly remunerate the one or more crowdworkers. Some examples of the application server 104 may include, but not limited to, Java application server, .NET framework, and Base4 application server.

A person having ordinary skills in the art would understand that the scope of the disclosure is not limited to illustrating the application server 104 as a separate entity. In an embodiment, the functionality of the application server 104 may be implementable on/integrated with the crowdsourcing platform server 102.

The requestor computing device 106 is a computing device used by a requestor. The requestor sends the one or more task requests to the application server 104 from the requestor computing device 106. Examples of the requestor computing device 106 include, but are not limited to, a personal computer, a laptop, a personal digital assistant (PDA), a mobile device, a tablet, or any other computing device.

The database server 108 stores information associated with the one or more crowdworkers. Further, the database server 108 stores information associated with the one or more uploaded tasks. In an embodiment, the database server 108 may receive a query from at least one of the crowdsourcing platform server 102 or the application server 104 to extract information associated with the one or more crowdworkers, or the one or more uploaded tasks. The database server 108 may be realized through various technologies such as, but not limited to, Microsoft® SQL server, Oracle, and My SQL. In an embodiment, the crowdsourcing platform server 102 and/or the application server 104 may connect to the database server 108 using one or more protocols such as, but not limited to, ODBC protocol and JDBC protocol.

A person having ordinary skills in the art would understand that the scope of the disclosure is not limited to the database server 108 as a separate entity. In an embodiment, the functionalities of the database server 108 can be integrated into the crowdsourcing platform server 102 and/or the application server 104.

The crowdworker computing device 110 is a computing device used by a crowdworker. The crowdworker computing device 110 is operable to present the user interface (received from the crowdsourcing platform) to the crowdworker. The crowdworker receives the one or more tasks from the crowdsourcing platform through the user interface. Thereafter, the crowdworker submits the response through the user interface to the crowdsourcing platform. In an embodiment, the crowdworker may provide an audio input as a response to a task. In an embodiment, the crowdworker computing device 110 may include speech recognition functionality. In an embodiment, the crowdworker computing device 110 may perform speech-to-text conversion on the audio input to generate one or more phrases. Thereafter, the crowdworker computing device 110 may present the one or more phrases to the crowdworker through the user interface. The crowdworker may provide an input to select a phrase from the one or more phrases as a correct response to the task. In an alternate embodiment, the crowdworker computing device 110 may transmit the audio input to the speech recognition server 112 for performing speech-to-text conversion. Some examples of the crowdworker computing device 110 include a personal computer, a laptop, a PDA, a mobile device including a mobile phone, a smart-phone, a tablet, or any device that has the capability to display the user interface and receive the audio input. The crowdworker computing device 110 is described later with respect to FIG. 2. The user interface of the crowdworker computing device 110 is described later with respect to FIG. 6.

In an embodiment, the speech recognition server 112 receives the audio input from the crowdworker through the crowdworker computing device 110 as an audio response to the crowdsourced task. The speech recognition server 112 performs speech-to-text conversion on the audio input to generate the one or more phrases. Further, the speech recognition server 112 may send the one or more phrases to the crowdworker computing device 110. The speech recognition server 112 may implement one or more techniques to perform speech-to-text conversion such as, but not limited to, Hidden Markov Model (HMM), dynamic time warping (DTW) based speech recognition, neural networks, or artificial intelligence.

A person having ordinary skills in the art would understand that the scope of the disclosure is not limited to the speech recognition server 112 as a separate entity. In an embodiment, the functionalities of the speech recognition server 112 can be integrated into the crowdsourcing platform server 102, the application server 104, and/or the crowdworker computing device 110.

The network 114 corresponds to a medium through which content and messages flow between various devices of the system environment 100 (e.g., the crowdsourcing platform server 102, the application server 104, the requestor computing device 106, the database server 108, the crowdworker computing device 110, and the speech recognition server 112). Examples of the network 114 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 114 in accordance with various wired and wireless communication protocols such as Transmission Control Protocol and Internet Protocol (TCP/IP), User Datagram Protocol (UDP), and 2G, 3G, or 4G communication protocols.

Figure 2:
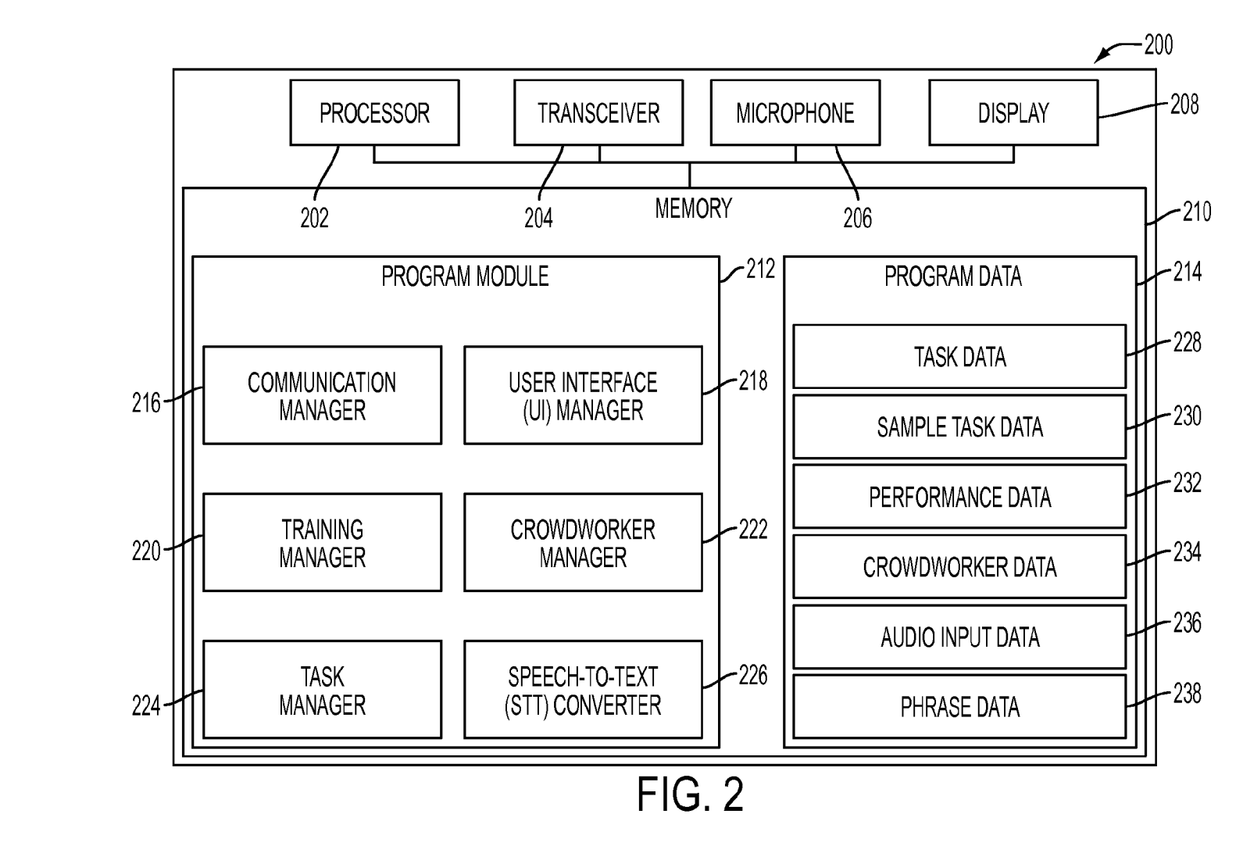
FIG. 2 is a block diagram illustrating a system for processing one or more crowdsourced tasks, in accordance with at least one embodiment.

FIG. 2 is a block diagram illustrating a system 200 for processing one or more crowdsourced tasks, in accordance with at least one embodiment. In an embodiment, the system 200 can be realized as the crowdworker computing device 110. The system 200 includes a processor 202, a transceiver 204, a microphone 206, a display 208, and a memory 210.

The processor 202 is coupled to the transceiver 204, the microphone 206, the display 208, and the memory 210. The processor 202 executes a set of instructions (as various program instruction modules) stored in the memory 210 to perform a predetermined operation on the system 200. The processor 202 can be realized through a number of processor technologies known in the art. Examples of the processor 202 may include, but are not limited to, X86 processor, RISC processor, ASIC processor, CISC processor, ARM processor, or any other processor.

The transceiver 204 transmits and receives messages and data to/from various devices of the system environment 100 (e.g., the crowdsourcing platform server 102, the application server 104, the requestor computing device 106, the database server 108, and the speech recognition server 112). Examples of the transceiver 204 may include, but are not limited to, an antenna, an Ethernet port, a Universal Serial Bus (USB) port, or any other port that can be configured to receive and transmit data. The transceiver 204 transmits and receives data/messages in accordance with various communication protocols such as, TCP/IP, UDP, and 2G, 3G, or 4G communication protocols.

The microphone 206 receives the audio input from the crowdworker. The microphone 206 may be coupled to an ND converter (not shown) that converts the analog audio input to a digital signal for further processing. In an embodiment, the microphone 206 may be in-built into the system 200. In an alternate embodiment, the microphone 206 may be external to the system 200 and communicatively coupled to the system 200 through any wired or wireless connection. Wired connection may include, but is not limited to, a microphone jack cable, a USB cable, or any other wired connection. Wireless connection may include, but is not limited to, Bluetooth, Wireless LAN (WLAN), Wireless Personal Area Network (PAN), or any other wireless connection. Examples of the microphone 206 may include any acoustic-to-electric transducer.

The display 208 displays the user interface of the system 200 to the crowdworker. The display 208 can be realized through several known technologies, such as, Cathode Ray Tube (CRT) based display, Liquid Crystal Display (LCD), Light Emitting Diode (LED) based display, Organic LED display technology, and Retina display technology. Further, the display 208 can be a touch screen operable to receive a user input.

The memory 210 stores a set of instructions and data. Some of the commonly known memory implementations include, but are not limited to, a random access memory (RAM), a read only memory (ROM), a hard disk drive (HDD), and a secure digital (SD) card. Further, the memory 210 includes a program module 212 and a program data 214.

The program module 212 includes a set of instructions executable by the processor 202 to perform specific operations on the system 200. The program module 212 includes various program instructions modules such as a communication manager 216, a user interface (UI) manager 218, a training manager 220, a crowdworker manager 222, a task manager 224, and a speech-to-text (STT) converter 226.

The program data 214 includes a task data 228, a sample task data 230, performance data 232, a crowdworker data 234, an audio input data 236, and a phrase data 238.

The communication manager 216 receives the user interface from the crowdsourcing platform. Further, the communication manager 216 receives the one or more tasks from the crowdsourcing platform. The communication manager 216 stores the one or more tasks as the task data 228. Additionally, the communication manager 216 transmits correct responses for the one or more tasks to the crowdsourcing platform. The communication manager 216 includes various protocol stacks such as, but not limited to, TCP/IP, UDP, and 2G, 3G, or 4G communication protocols. The communication manager 216 transmits and receives the messages/data (e.g., images and the like) through the transceiver 204 in accordance with such protocol stacks.

The user interface (UI) manager 218 displays the user interface received by the communication manager 216 on the display 208. Further, the UI manager 218 presents the one or more tasks to the crowdworker through the user interface. The UI manager 218 further includes one or more driver modules for the microphone 206. The driver modules define a set of rules for the microphone 206 to work in a prescribed manner. Further, in a scenario when the display 208 is a touch screen, the UI manager 218 includes one or more driver modules for receiving a user input through the display 208. The UI manager 218 modifies the user interface based on at least one of the audio input or the user input received from the crowdworker.

The training manager 220 trains the STT converter 226. In an embodiment, the training manager 220 presents one or more sample tasks to the crowdworker on the display 208 through the user interface. The training manager 220 maintains a set of correct audio responses for each of the one or more sample tasks. In an embodiment, the one or more sample tasks and the set of correct audio responses are stored as the sample task data 230. The training manager 220 compares audio responses received from the crowdworker for the one or more sample tasks with the set of correct audio responses to determine an accent of the crowdworker. Based on the accent, the training manager 220 trains the STT converter 226. Further, the training manager 220 determines a performance score of the crowdworker based on the comparison. The training manager 220 stores the performance score as the performance data 232. Examples of training techniques include neural networks, radial basis functions, support vector machines (SVM), Naïve Bayes, k-nearest neighbor algorithm, and other machine learning techniques.

The crowdworker manager 222 generates and maintains a profile associated with the crowdworker. In an embodiment, the profile may include one or more parameters associated with the crowdworker such as but not limited to, a qualification of the crowdworker, a skill set of the crowdworker, the performance score of the crowdworker on one or more sample tasks, and the accent of the crowdworker. In an embodiment, the crowdworker manager 222 maintains the profile as the crowdworker data 234. The crowdworker manager 222 selects a mode of the audio input for the crowdworker based on the one or more parameters.

The task manager 224 retrieves the crowdsourced task from the task data 228 and subsequently presents the crowdsourced task to the crowdworker on the display 208 through the user interface. Thereafter, the crowdworker may provide the audio input through the microphone 206 as the response to the crowdsourced task being presented on the user interface. The task manager 224 stores the audio input corresponding to the task as the audio input data 236. In an embodiment, the task manager 224 may transmit the stored audio input for speech-to-text conversion to the speech recognition server 112 through the communication manager 216.

The speech-to-text (STT) converter 226 extracts the audio input from the audio input data 236. Thereafter, the STT converter 226 converts the audio input to the one or more phrases by performing speech-to-text conversion on the audio input. The STT converter 226 stores the one or more phrases as the phrase data 238. The task manager 224 retrieves the one or more phrases from the phrase data 238 and presents the one or more phrases to the crowdworker on the display 208 through the user interface of the system 200. The crowdworker may select a phrase from the one or more phrases as the correct response to the crowdsourced task.

Figure 3:
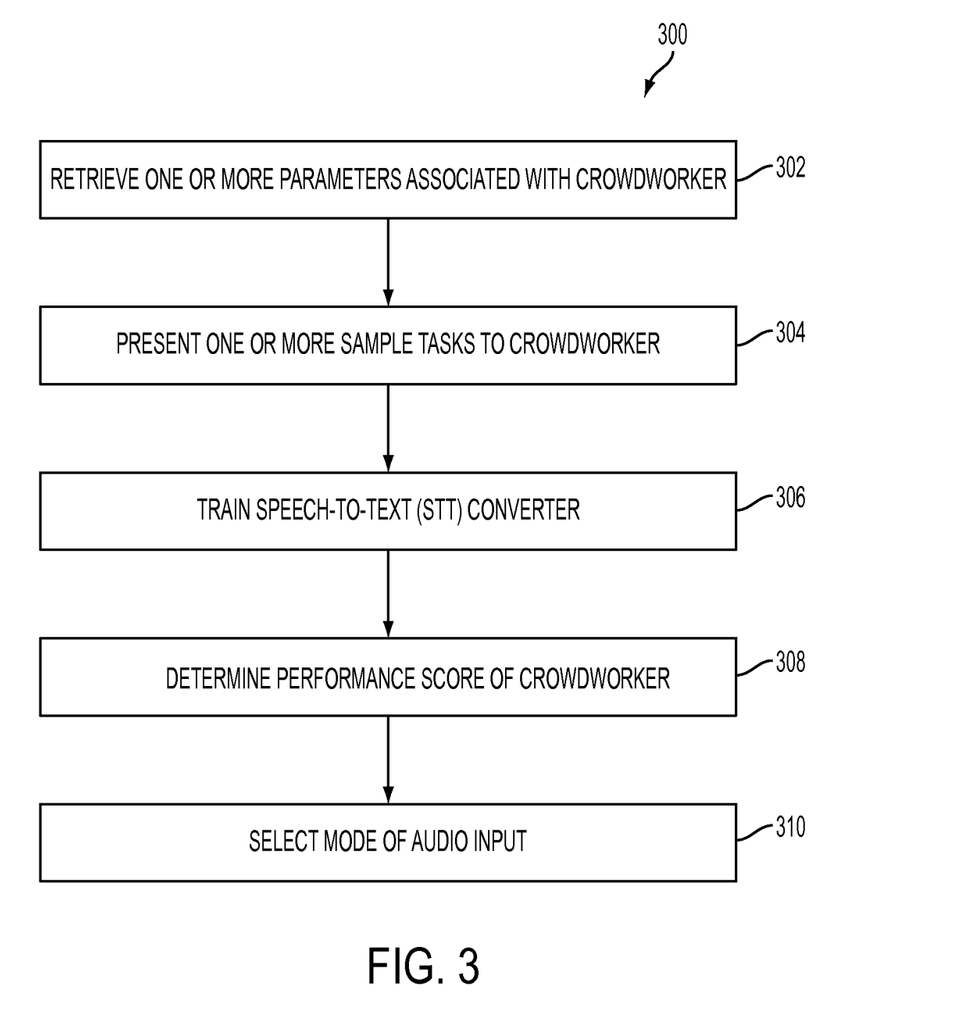
FIG. 3 is a flowchart illustrating a method for training a computing device of the disclosure for speech-to-text conversion, in accordance with at least one embodiment.

FIG. 3 is a flowchart illustrating a method 300 for training the speech-to-text converter 226, in accordance with at least one embodiment.

At step 302, the one or more parameters associated with the crowdworker are retrieved from the crowdworker data 234. In an embodiment, the crowdworker manager 222 retrieves the one or more parameters. In an embodiment, the one or more parameters may be deterministic of an accent of the crowdworker. For example, demographic details of the crowdworker such as age, gender, geographic location, ethnicity, or other such details may be used to determine the accent of the crowdworker. For example, if a crowdworker belongs from south India, the accent will be governed by the accent of the native language (i.e., Tamil, Telugu, Malayalam, etc.). Moreover, age and gender dependent factors such as voice pitch and frequency may influence the accent.

In another embodiment, the accent of the crowdworker may be determined during training of the STT converter 226.

At step 304, the one or more sample tasks are presented to the crowdworker. In an embodiment, the training manager 220 presents these one or more sample tasks to the crowdworker through the user interface. For example, a sample task may be a task to pronounce each alphabet, numeral and symbol in a language. The sample task may also include word-wise or character-wise pronouncing of one or more common words or phrases in the language. The crowdworker provides the audio responses for the one or more sample tasks being presented on the user interface. The training manager 220 correlates the received audio responses with the set of correct audio responses for the one or more sample tasks. In an embodiment, the training manager 220 may utilize one or more speech processing techniques such as, but not limited to, Hidden Markov Model (HMM), dynamic time warping (DWT) based speech recognition, and neural networks.

Further, the training manager 220 utilizes the above-mentioned techniques to identify the accent of the crowdworker. In order to determine the accent of the crowdworker, the training manager 220 maintains the set of correct audio responses for the sample tasks in one or more known accents. The training manager 220 compares the audio response received from the crowdworker with the one or more known accents of the correct audio response. Based on the comparison, the accent of the person is determined.

At step 306, the speech-to-text (STT) converter 226 is trained. In an embodiment, the training manager 220 trains the STT converter 226. In an embodiment, the training manager 220 utilizes the correlated data to train the STT converter 226. Some examples of known training techniques include neural networks, radial basis functions, support vector machines (SVM), Naïve Bayes, k-nearest neighbor algorithm, or other machine learning techniques.

At step 308, the performance score of the crowdworker on the one or more sample tasks is determined. The training manager 220 determines this performance score. In an embodiment, the performance score may correspond to an accuracy ratio of the crowdworker obtained as a ratio of number of correctly attempted tasks to total number of attempted tasks. For example, the training manager 220 may present 36 sample tasks to a crowdworker for pronouncing the 26 alphabets (a-z) and the 10 numerals (0-9) in English language. If it is determined that the crowdworker pronounces 20 alphabets and 7 numerals correctly, the number of correctly attempted sample tasks would be 27 (20+7). In this scenario, the performance score of the crowdworker would be 0.75 (27/36). In an embodiment, the crowdworker manager 222 updates the profile of the crowdworker based on the determined accent of the crowdworker and the performance score of the crowdworker on the one or more sample tasks.

A person skilled in the art would understand that the scope of the disclosure is not limited to determining the performance score of the crowdworker using the above-described technique. The performance score may be determined by using any other suitable technique such as examples.

At step 310, the mode of the audio input is selected. In an embodiment, the crowdworker manager 222 selects the mode of the audio input based on the one or more parameters associated with the crowdworker. In an embodiment, the mode of the audio input may include at least one of a character-wise speech or a word-wise speech. For example, the crowdworker manager 222 may select the character-wise speech mode when the performance score is less than 0.7 and may select the word-wise speech mode when the performance score is greater than or equal to 0.7.

In an embodiment, the crowdworker manager 222 may recommend a preferred mode of the audio input to the crowdworker based on the profile associated with the crowdworker. For example, if a profile of a crowdworker indicates that the crowdworker has a primary school literacy level and a rural background, the crowdworker manager 222 may recommend the character-wise speech mode for the crowdworker. However, if the profile indicates that the crowdworker is an undergraduate from a semi-urban or urban background, the crowdworker manager 222 may recommend the word-wise speech mode.

In another embodiment, the crowdworker may select the mode of the audio input manually based on his/her convenience.

Figure 4:
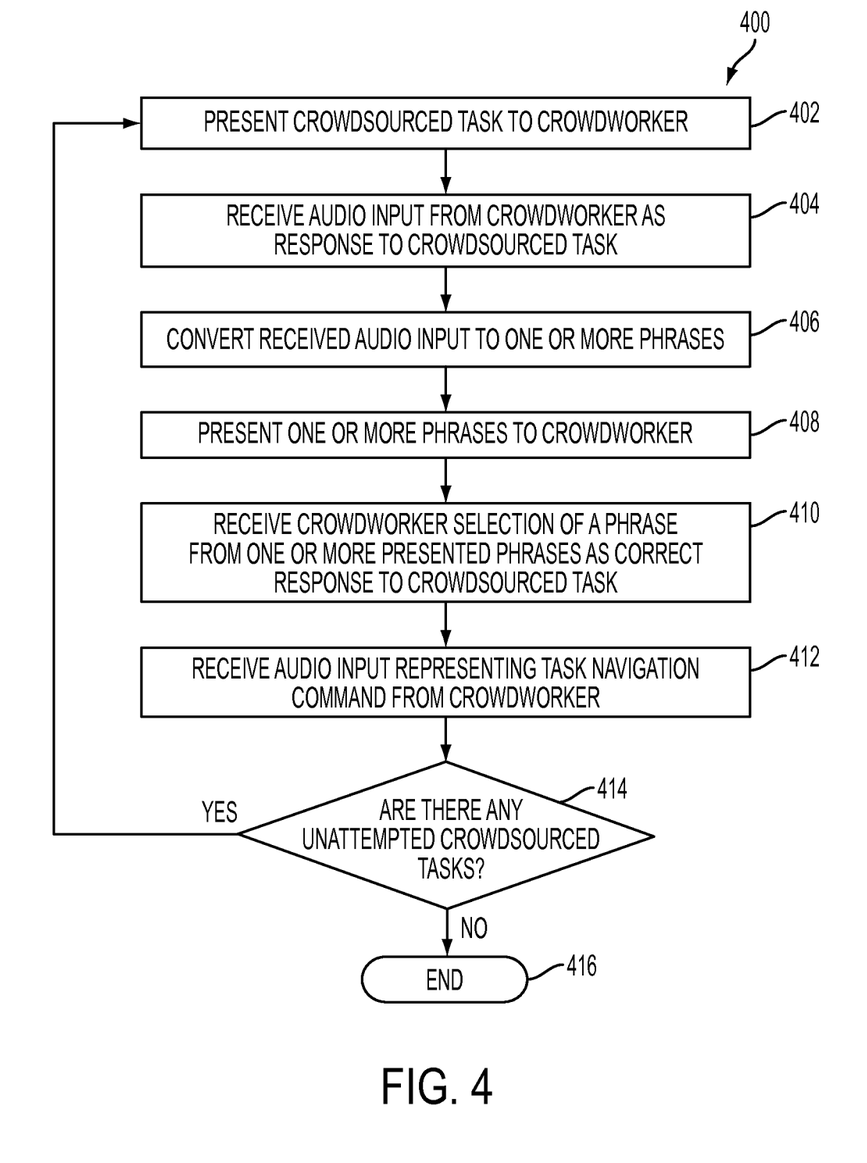
FIG. 4 is a flowchart illustrating a method for processing one or more crowdsourced tasks, in accordance with one or more embodiments.

FIG. 4 is a flowchart illustrating a method 400 for processing one or more crowdsourced tasks, in accordance with one or more embodiments.

At step 402, the crowdsourced task is presented to the crowdworker. In an embodiment, the communication manager 216 receives the one or more tasks from the crowdsourcing platform and stores the received one or more tasks as the task data 228. The task manager 224 retrieves the one or more tasks from the task data 228 and presents a crowdsourced task from the one or more tasks on the display 208 through the user interface.

At step 404, the audio input is received from the crowdworker as the response to the presented crowdsourced task. The audio input is received from the crowdworker through the microphone 206. In an embodiment, the audio input is received according to the mode of the audio input selected by the crowdworker manager 222 at step 310 of the method 300.

At step 406, the received audio input is converted to the one or more phrases. The STT converter 226 converts the received audio input to the one or more phrases by performing the speech-to-text conversion on the received audio input. In an embodiment, the STT converter 226 stores the one or more phrases as the phrase data 238.

At step 408, the one or more phrases are presented to the crowdworker. The task manager 224 retrieves the one or more from the phrase data 238 and presents the one or more retrieved phrases to the crowdworker on the display 208 through the user interface.

At step 410, a crowdworker's selection of a phrase from the one or more presented phrases is received as a correct response to the crowdsourced task. In an embodiment, the UI manager 218 receives the crowdworker's selection of the phrase from the one or more presented phrases through the user interface. The selected phrase corresponds to the correct response to the presented crowdsourced task. In an embodiment, the crowdworker may provide a user input through the display 208. A person skilled in the art would understand that the scope of the disclosure is not limited to selecting the phrase by providing user input through the display 208. In an embodiment, the crowdworker's selection is received as an audio input through the microphone 206. For example, if "great work", "grate work", and "grit work" are the one or more phrases presented to the crowdworker, the crowdworker may provide an audio input of "phrase one" or "first phrase" to select the phrase "great work". In an alternate embodiment, the crowdworker may provide appropriate touch input or select an appropriate option on the display using a mouse, keyboard, or any other input medium.

In an embodiment, the task manager 224 stores the selected phrase to the task data 228. Further, the task manager 224 uploads the selected phrase as the correct response for the presented task to the crowdsourcing platform through the communication manager 216. In an alternate embodiment, the task manager 224 uploads the correct responses for the one or more tasks to the crowdsourcing platform in a batch mode after each of the one or more tasks have been attempted by the crowdworker (at step 416).

At step 412, an audio input representing a task navigation command is received from the crowdworker. In an embodiment, the UI manager 218 receives the audio input representing the task navigation command through the microphone 206. In an alternate embodiment, the UI manager 218 receives the task navigation command through the user interface.

At step 414, a check is performed to determine whether there are any more un-attempted crowdsourced tasks among the one or more crowdsourced tasks. The task manager 224 determines whether there are un-attempted crowdsourced tasks among the one or more crowdsourced tasks. The user interface manager 218 then determines whether the received task navigation command corresponds to a request for presenting a next crowdsourced task. If it is determined that the received task navigation command corresponds to the request for presenting the next crowdsourced task and there exists at least one un-attempted task, the task manager 224 presents the next crowdsourced task from the one or more crowdsourced tasks (step 402).

The steps 402-414 are repeated until there are no further un-attempted crowdsourced tasks. The method 400 terminates at step 416 when it is determined that there are no further un-attempted crowdsourced tasks.

In an alternate embodiment, when the audio input is received from the crowdworker as the response to the presented crowdsourced task, the task manager 224 stores the received audio input as the audio input data 236. Thereafter, if any un-attempted crowdsourced tasks exist, the task manager 224 presents the next crowdsourced task to the crowdworker. This process repeats until each of the one or more crowdsourced tasks have been attempted. After each of the one or more tasks has been attempted, the STT converter 226 retrieves the audio input corresponding to each task from the audio input data 236 and performs the speech-to-text conversion on the retrieved audio input for the tasks in a batch mode.

A person skilled in the art would appreciate that the scope of the disclosure should not be limited to the crowdworker selecting the phrase corresponding to the correct response of the crowdsourced task from the one or more presented phrases.

In an embodiment, the STT converter 226 may generate a phrase corresponding to the correct response to the task. Thus, no further selection from the crowdworker may be required. In such a scenario, the STT converter 226 generates the one or more phrases by performing the speech-to-text conversion on the audio input and subsequently selects the phrase from the one or more generated phrases using one or more predictive modeling techniques. Examples of predictive modeling techniques include support vector machines (SVM), Naïve Bayes, k-nearest neighbor algorithm, statistical modeling, and other such techniques.

In an embodiment, the crowdworker manager 222 may monitor performance of the crowdworker on the one or more crowdsourced tasks and update the profile of the crowdworker based on a performance score of the crowdworker on the one or more crowdsourced tasks. Based on the updated profile of the crowdworker, the crowdworker manager 222 may select a different mode of the audio input than the current mode. In an embodiment, the performance score of the crowdworker on the one or more crowdsourced tasks may be received from the crowdsourcing platform. In an embodiment, the crowdsourcing platform may employ one or more correctness resolution techniques to determine a correct response for each of the one or more tasks. Thereafter, the crowdsourcing platform may compare the responses received from the crowdworker for the one or more tasks with the determined correct response of the respective task. The crowdsourcing platform may determine the performance score of the crowdworker on the one or more tasks based on this comparison.

Figure 5:
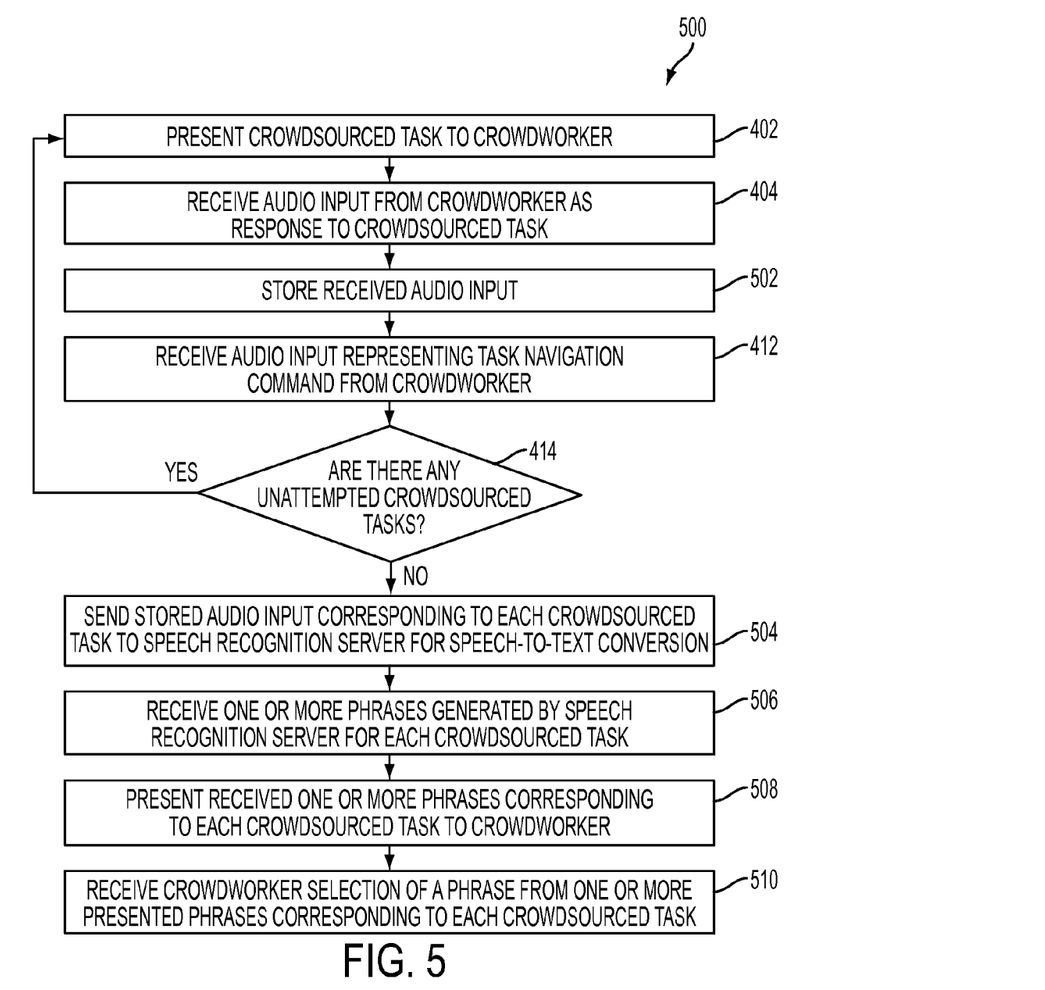
FIG. 5 is a flowchart illustrating a method for processing one or more crowdsourced tasks, in accordance with one or more other embodiments.

FIG. 5 is a flowchart illustrating a method 500 for processing one or more crowdsourced tasks, in accordance with one or more other embodiments.

At step 402, the crowdsourced task is presented to the crowdworker.

At step 404, the audio input is received from the crowdworker as the response to the presented crowdsourced task.

At step 502, the received audio input is stored. The task manager 224 stores the received audio input as the audio input data 236.

At step 412, an audio input representing a task navigation command is received from the crowdworker.

At step 414, a check is performed to determine whether there are any more un-attempted crowdsourced tasks among the one or more crowdsourced tasks.

The steps 402-414 are repeated until there are no further un-attempted crowdsourced tasks.

At step 504, when it is determined that there are no further un-attempted crowdsourced tasks, the stored audio input corresponding to each of the one or more crowdsourced tasks is sent to the speech recognition server 112 for the speech-to-text conversion. The task manager 224 retrieves the stored audio input corresponding to each of the one or more crowdsourced tasks from the audio input data 236. Thereafter, the task manager 224 sends the stored audio input for the speech-to-text conversion to the speech recognition server 112 through the communication manager 216.

At step 506, one or more phrases generated by the speech recognition server 112 corresponding to each of the one or more crowdsourced tasks are received. The communication manager 216 receives the one or more generated phrases corresponding to each of the one or more crowdsourced tasks from the speech recognition server 112. Thereafter, the communication manager 216 stores the received one or more phrases corresponding to each of the one or more crowdsourced tasks as the phrase data 238.

At step 508, for each of the one or more crowdsourced tasks, the one or more received phrases corresponding to the respective crowdsourced task are presented to the crowdworker. The task manager 224 retrieves the one or more phrases corresponding to each crowdsourced tasks from the phrase data 238. Thereafter, for each of the one or more crowdsourced tasks, the task manager 224 presents the retrieved one or more phrases to the crowdworker.

At step 510, for each of the one or more crowdsourced tasks, a crowdworker selection of a phrase from the one or more presented phrases is received as the correct response to the respective crowdsourced task. For each of the one or more crowdsourced tasks, the UI manager 218 receives the crowdworker selection of the phrase from the one or more presented phrases.

In an embodiment, the steps 506 through 510 may be skipped and the communication manager 216 may receive a phrase for each of the one or more crowdsourced tasks from the speech recognition server 112. In this scenario, each received phrase corresponds to the correct response to the respective crowdsourced task. Further, the task manager 224 uploads the correct responses for the one or more crowdsourced tasks to the crowdsourcing platform through the communication manager 216.

Alternatively, for each of the one or more crowdsourced tasks, the speech recognition server 112 may upload the phrase as the correct response for the respective task to the crowdsourcing platform.

Figure 6:
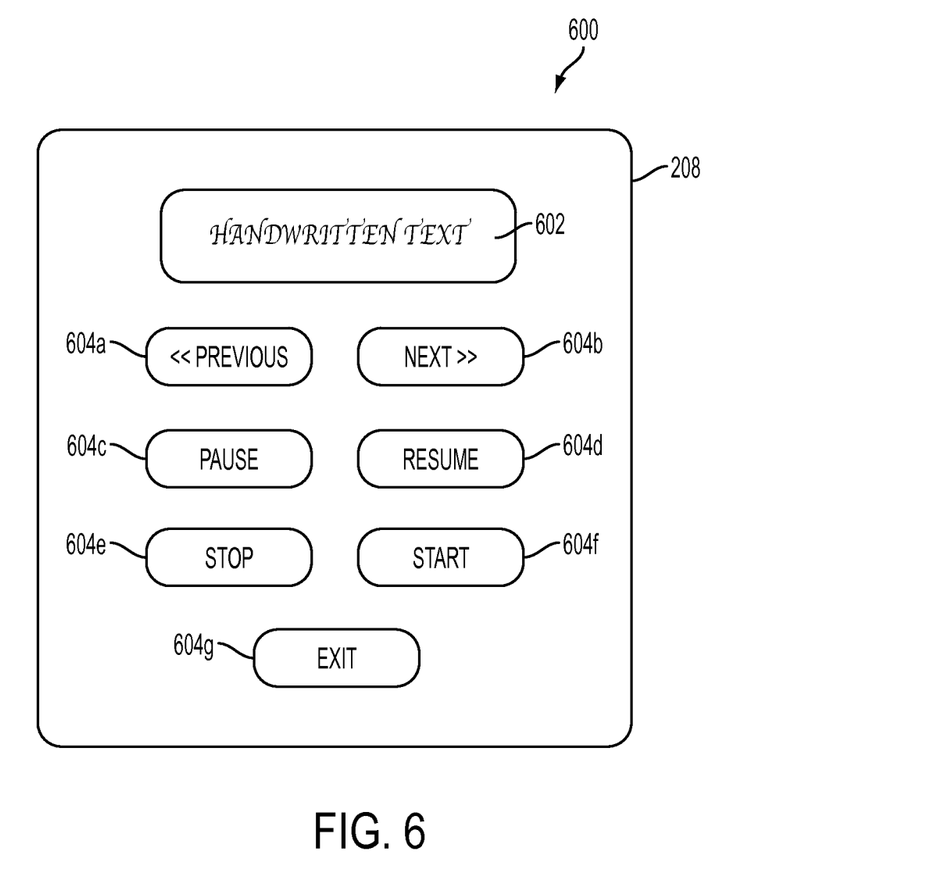
FIG. 6 depicts a user interface of a computing device of the disclosure, in accordance with at least one embodiment.

FIG. 6 depicts a user interface of the crowdworker computing device 110, in accordance with at least one embodiment.

The user interface is displayed through the display 208 of the crowdworker computing device 110. In an embodiment, the one or more crowdsourced tasks are presented to the crowdworker through the user interface. The user interface may include a task display area 602 and one or more buttons including 604a-604g. In an embodiment, the one or more crowdsourced tasks are presented within the task display area 602 of the user interface. For example, a handwritten text corresponding to a form digitization task may be displayed within the task display area 602. In an embodiment, the buttons 604a and 604b may be task navigation buttons such as "Previous" and "Next" buttons for navigating to a previous and a next task respectively. In an embodiment, the buttons 604c-604g may be application-specific buttons such as "Pause", "Resume", "Stop", "Start" and "Exit" buttons, respectively, for performing corresponding application-specific actions. In an embodiment, the one or more phrases may be presented to the crowdworker as a pop-up menu list on the user interface.

Those skilled in the art would appreciate that the scope of the disclosure with respect to the user interface of the crowdworker computing device 110 should not be limited to that described above. The user interface may be implemented with one or more variations without departing from the spirit of the disclosure.

The disclosed embodiments encompass numerous advantages. Various embodiments of the disclosure lead to an increase in productivity of the crowdworkers. The crowdworkers are saved from typing responses to the crowdsourced tasks. Instead, they can provide a spoken equivalent of the response. This leads to a considerable time saving.

The crowdworkers are provided with a hands-free operating experience while attempting the crowdsourced tasks. This enables the crowdworkers to attempt the crowdsourced tasks while on the move without any restrictions. For example, the crowdworkers may attempt the tasks using a mobile device while travelling on a public transport irrespective of whether they are able to type. Another advantage is that a physically handicapped person may also be able to attempt the crowdsourced tasks thereby providing him/her with employment opportunity and economic benefits.

Inaccuracies in the speech-to-text conversion due to poor quality of the received audio input or otherwise are mitigated by receiving a confirmation from the crowdworker. The STT converter 226 performs the speech-to-text conversion on the received audio input to generate the one or more closely matching phrases. These one or more phrases are later presented to the crowdworker to ascertain the correct response for the crowdsourced task. Further, the accuracy of the speech-to-text conversion is improved when the STT converter 226 is trained based on the accent of the crowdworker that is determined when the crowdworker attempts the one or more sample tasks.

Moreover, a crowdworker may provide audio input in an audio input mode that is more suited to the crowdworker. Thus, a crowdworker who is fluent in a language may provide audio inputs in a word-wise speech mode while a crowdworker who is familiar with a language but not as fluent may use a character-wise speech mode. In addition, the crowdworkers are also provided flexibility to choose their preferred mode of audio input. Further, the mode of audio input may be changed according to performance of the crowdworker on the one or more crowdsourced tasks. For example, initially the crowdworker may provide audio input in the character-wise speech mode. However, over a period as the communication skills of the crowdworker in the particular language improve, the crowdworker may provide audio input in the word-wise speech mode.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, optical-disk drive, and the like. The storage device may also be a means for loading computer programs or other instructions onto the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through the I/O interface.

To process input data, the computer system executes a set of instructions that is stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages, including but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for processing crowdsourced tasks have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person having ordinary skills in the art will appreciate that the systems, modules, and sub-modules have been illustrated and explained to serve as examples and should not be considered limiting in any manner. It will be further appreciated that the variants of the above disclosed system elements, modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, and the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for processing one or more crowdsourced tasks, the method comprising: in at least one computing device: converting an audio input received from a crowdworker to one or more phrases by one or more processors in the at least one computing device, wherein the audio input is at least a response to a crowdsourced task, a mode of the audio input being recommended to the crowdworker based a performance score associated with the crowdworker; wherein the mode of the audio input is selected from a group consisting of a character-wise speech and a word-wise speech and the performance score corresponds to an accuracy ration of the crowdworker obtained as a ratio of number of correctly attempted tasks to total number of attempted tasks; and presenting the one or more phrases on a display of the at least one computing device by the one or more processors, wherein a phrase from the one or more phrases is selected by the crowdworker as a correct response to the crowdsourced task.

2. The method of claim 1, further comprising presenting the crowdsourced task on the display through a user interface by the one or more processors.

3. The method of claim 2, wherein the audio input corresponds to at least a command to control the user interface.

4. The method of claim 1, wherein the one or more parameters associated with the crowdworker comprise at least one of a qualification of the crowdworker, a skill set of the crowdworker, a performance score of the crowdworker on one or more sample tasks, or an accent of the crowdworker.

5. The method of claim 1, wherein the mode of the audio input comprises at least one of a character-wise speech, or a word-wise speech.

6. The method of claim 1, further comprising storing the audio input on a memory device in the at least one computing device by the one or more processors.

7. The method of claim 6, wherein the stored audio input is converted to the one or more phrases by a server.

8. The method of claim 1, further comprising training the at least one computing device by presenting one or more sample tasks to the crowdworker, wherein the at least one computing device is trained based on an accent of the crowdworker, whereby the training enables the at least one computing device to convert the audio input to the one or more phrases.

9. The method of claim 8, further comprising determining a performance score of the crowdworker based on the training.

10. The method of claim 1, further comprising receiving an input from the crowdworker to recommend the mode of the audio input.

11. A system comprising at least one computing device for processing one or more crowdsourced tasks, the at least one computing device comprising: one or more processors operable to: convert an audio input received from a crowdworker to one or more phrases, wherein the audio input is at least a response to a crowdsourced task, a mode of the audio input being recommended to the crowdworker based a performance score associated with the crowdworker; wherein the mode of the audio input is selected from a group consisting of a character-wise speech and a word-wise speech and the performance score corresponds to an accuracy ration of the crowdworker obtained as a ratio of number of correctly attempted tasks to total number of attempted tasks; and present the one or more phrases on a display of the at least one computing device, wherein a phrase from the one or more phrases is selected by the crowdworker as a correct response to the crowdsourced task.

12. The system of claim 11, wherein the one or more processors are further operable to present the crowdsourced task on the display through a user interface.

13. The system of claim 12, wherein the audio input corresponds to at least a command to control the user interface.

14. The system of claim 11, wherein the mode of the audio input comprises at least one of a character-wise speech, or a word-wise speech.

15. The system of claim 11, wherein the one or more processors are further operable to store the audio input on a memory device in the at least one computing device.

16. The system of claim 15, wherein the stored audio input is converted to the one or more phrases by a server.

17. The system of claim 11, wherein the one or more processors are further operable to train the at least one computing device by presenting one or more sample tasks to the crowdworker, wherein the at least one computing device is trained based on an accent of the crowdworker.

18. A computer program product for use with a computing device, the computer program product comprising a non-transitory computer-readable medium having a computer readable program code embodied therein for processing one or more crowdsourced tasks, wherein the computer readable program code is executable by one or more processors in at least one computing device for: presenting a crowdsourced task on a display of the at least one computing device through a user interface, wherein the crowdsourced task is presented in response to receiving a first audio input from a crowdworker, wherein the first audio input corresponds to at least a command to control the user interface; converting a second audio input received from the crowdworker to one or more phrases, wherein the second audio input is at least a response to the crowdsourced task, a mode of the second audio input being recommended to the crowdworker based on a performance score associated with the crowdworker, wherein the mode of the second audio input comprises at least one of a character-wise speech, or a word-wise speech; wherein the mode of the audio input is selected from a group consisting of a character-wise speech and a word-wise speech and the performance score corresponds to an accuracy ration of the crowdworker obtained as a ratio of number of correctly attempted tasks to total number of attempted tasks; and presenting the one or more phrases on the display, wherein a phrase from the one or more phrases is selected by the crowdworker as a correct response to the crowdsourced task.

19. The computer program product of claim 18, wherein the second audio input is stored on a memory device in the at least one computing device by the one or more processors, and wherein the stored audio input is converted to the one or more phrases by a server.

20. The computer program product of claim 18, wherein the computer readable program code is further executable by the one or more processors for training the at least one computing device by presenting one or more sample tasks to the crowdworker, wherein the at least one computing device is trained based on an accent of the crowdworker, whereby the training enables the computing device to convert the second audio input to the one or more phrases.

* * * * *